US007909245B1

(12) United States Patent
Chaskin et al.

(10) Patent No.: US 7,909,245 B1
(45) Date of Patent: *Mar. 22, 2011

(54) NETWORK BASED METHOD OF PROVIDING ACCESS TO INFORMATION (75) Inventors: Deborah Chaskin, Westfield, NJ (US); David M. Williamson, Hazlet, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/413,944

(22) Filed: Mar. 30, 2009

Related U.S. Application Data (63) Continuation of application No. 11/300,653, filed on Dec. 15, 2005, now Pat. No. 7,527,192.

(51) Int. Cl.
*G06Q 40/00* (2006.01)
*G07D 11/00* (2006.01)
*G07F 19/00* (2006.01)
(52) U.S. Cl. ................ 235/379; 235/382; 235/487
(58) Field of Classification Search .......... 235/379, 235/375, 382, 487; 705/44, 51
See application file for complete search history.

(56) References Cited

U.S. PATENT DOCUMENTS

| 6,389,402 | B1 | 5/2002 | Ginter et al. |
| 6,879,965 | B2 | 4/2005 | Fung et al. |
| 7,025,255 | B1 | 4/2006 | Drummond et al. |
| 7,047,416 | B2 | 5/2006 | Wheeler et al. |
| 7,069,249 | B2 | 6/2006 | Stolfo et al. |
| 7,089,584 | B1 | 8/2006 | Sharma |
| 7,155,508 | B2 | 12/2006 | Sankuratripati et al. |
| 2002/0147618 | A1* | 10/2002 | Mezrah et al. ............ 705/4 |
| 2003/0021417 | A1 | 1/2003 | Vasic et al. |
| 2003/0084339 | A1 | 5/2003 | Roginsky et al. |
| 2006/0101508 | A1* | 5/2006 | Taylor .................. 726/7 |
| 2006/0200855 | A1* | 9/2006 | Willis .................. 726/2 |
| 2006/0247991 | A1 | 11/2006 | Jin et al. |
| 2006/0248045 | A1 | 11/2006 | Toledano et al. |

OTHER PUBLICATIONS

Caroline E. Mayer, "Virtual Card Offers Online Security Blanket", http://www.washingtonpost.com/wp-dyn/content/article/2005/09/30/AR2005093001679.html.

* cited by examiner

*Primary Examiner* — Edwyn Labaze
(74) *Attorney, Agent, or Firm* — Myers Bigel Sibley & Sajovec (57) ABSTRACT

A computer implemented method of providing access to information includes issuing a secure identification element to a user. Such secure identification element is then submitted to a requesting entity in order to access the user's personal information. The requesting entity may access the user's personal information using the secure identification element by way of the processing agent. The processing agent may map the secure identification element to an information segment including personal information of the user by way of an identification element of the user and the information is transmitted to the requesting entity. The method provides a secure way to access personal information without divulging a user's identification number.

11 Claims, 6 Drawing Sheets

NETWORK BASED METHOD OF PROVIDING ACCESS TO INFORMATION

CROSS-REFERENCE OF RELATED APPLICATION

This application is a continuation of and claims priority to co-pending U.S. patent application Ser. No. 11/300,653 filed Dec. 15, 2005, now allowed, which is incorporated herein by reference in its entirety.

FIELD OF THE INVENTION

The present invention generally relates to telecommunications services, more particularly to a network based method of providing access to information, through the use of secure identification elements, more particularly to the issuance of secure identification numbers, mapped to personal information.

BACKGROUND

Identity theft has increasingly become a problem in recent times. Personal and confidential information of individuals is more accessible today than ever before. The problem is magnified in light of people transacting business on the internet using credit cards and providing identification numbers, such as a Social Security Number, to any number of different entities.

Identity theft is made worse when a person's Social Security Number is stolen. A person's Social Security Number gives access to vast amounts of confidential information. In addition, a Social Security Number can not easily be replaced. Unauthorized access to a person's Social Security Number gives the potential for serious damage to a person's credit and other financial data.

Personal identification information or numbers, such as a Social Security Number, is often required by various entities in order to process a customer transaction. For instance, a Social Security Number may be necessary in order to apply for a loan or a credit card or when enrolling in school. With the use of personal identification numbers being so commonplace, it is important to maintain the confidentiality of the number and the information associated with it.

Therefore, there is an urgent need to provide a method for protecting an individual's personal identification information that is easily implemented and managed by a trusted entity.

SUMMARY OF THE INVENTION

The present invention pertains to a method of providing access to information by issuing secure identification elements that may be used in place of actual identification elements to protect user confidentiality.

In one aspect, there is provided a method of retrieving information including receiving a request for information at a processing agent by way of a secure identification element. The secure identification element is then authenticated and the request is then processed by the processing agent including mapping the secure identification element to the information via a user's identification number.

In another aspect of the invention, there is provided a method of generating a secure identification element including receiving a request for such element and generating the secure identification element from a database or random generation process of such elements. The secure identification element is then transmitted to the user.

In yet another aspect of the invention, a network based method of providing access to information is generally implemented with a user access system and a telecommunications network, managed by a trusted entity or a trusted third party. In one example, an access system may include a database, a processing agent and a software mapping manager.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

The following embodiments and aspects thereof are described and illustrated in conjunction with systems tools and methods which are meant to be illustrative and non-limiting in scope. In a brief overview, a method of providing access to information is generally implemented with a user access system and a telecommunications network, managed by a trusted entity or a trusted third party. The trusted entity may be a data repository that may maintain user access rights, as well as secure identification elements and information segments including a user's personal information. Secure identification elements may be elements generated at the request of the user that may be logically linked to a user's personal or confidential information via a user identification element, such as a Social Security Number or other unique identification number. For example, the secure identification element may be a virtual Social Security Number that is logically linked to a user's personal information via the user's Social Security Number. The secure identification element may be used by a requesting entity to access the personal or confidential information of the user. Information segments may be data or documents relating to credit information, financial information, or other confidential information of the user.

Figure 1:
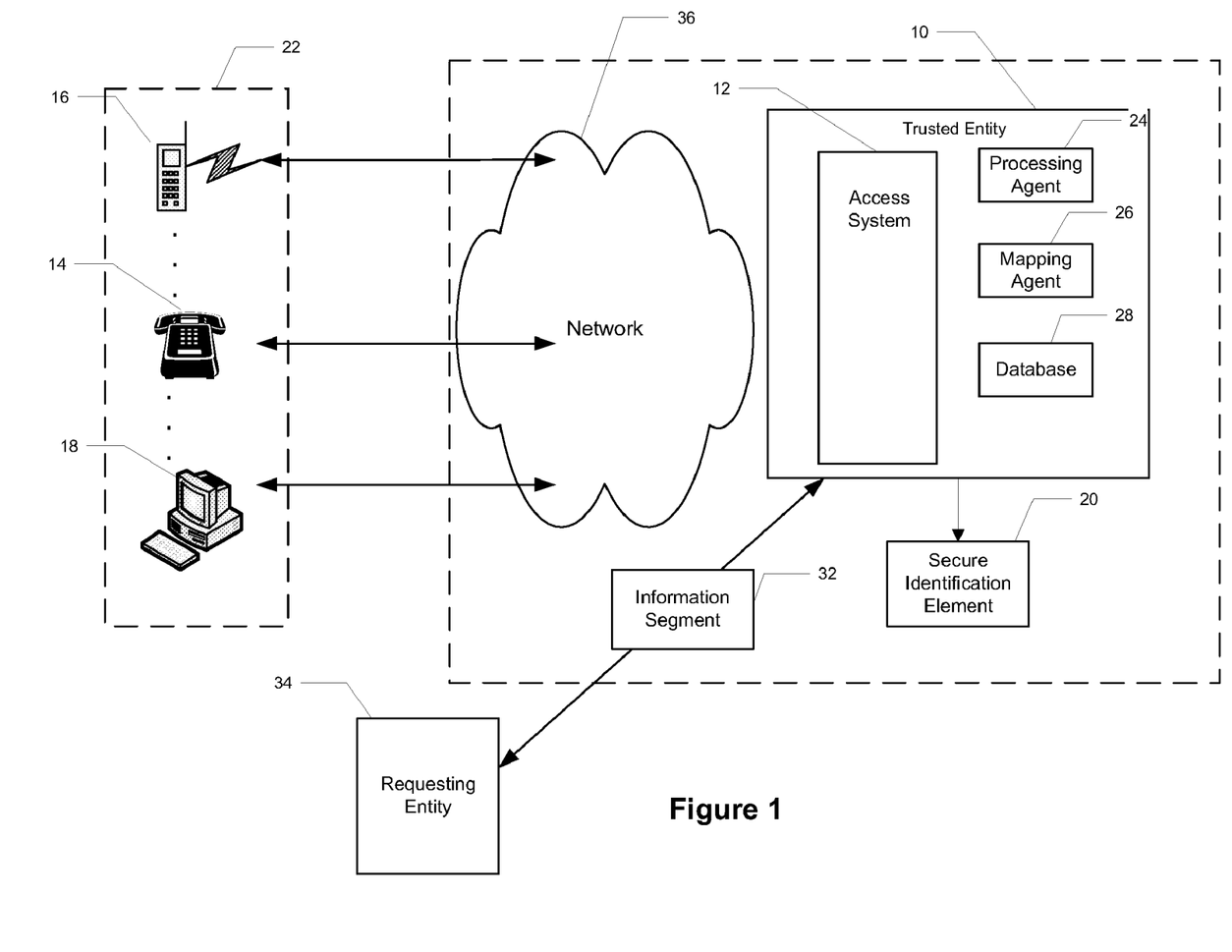
FIG. 1 is a schematic diagram of a network based system of providing access to information according to one embodiment.

FIG. 1 illustrates one embodiment of a network based system of providing access to information. With reference to FIG. 1, a user 22 may register with a trusted entity 10, or trusted third party, to establish a user account to be managed by the trusted entity 10. The access system 12 may be remotely located from the trusted entity 10 via high-speed data lines. In general, after the user 22 has registered with the access system 12, the trusted entity 10 may generate a secure identification element 20 that is then transmitted to the user 22. The user 22 may then issue this secure identification element 20 to a requesting entity 34, which may be an organization such as a business, educational institution, government entity, or any other such organization, requesting access to the user's personal and/or confidential information. The requesting entity 34 may access this personal information using the secure identification element 20 by way of the trusted entity 10. The processing agent 24 of the trusted entity 10 may confirm the validity of the secure identification element 20 and then, via the software mapping agent 26, map the secure identification element 20 to an information segment containing personal information of the user via an identification element of the user. The information segment 32 is then transmitted, via a network, to the requesting entity 34 in a secure manner, such as through the use of encryption. For example, the information segment may be data or documents relating to credit information, financial information, or other confidential information.

The access system 12 may be implemented with a general purpose computing device in the form of a host computer, including one or more central processing units, a system memory, and a system bus that couples various system components including the system memory, to the central processing unit. The system bus may be any one of several types of bus structures including a memory bus or memory controller, a peripheral bus, and a local bus using any one of a variety of bus architectures. The general purpose computing device may have an exemplary operating system such as MICROSOFT WINDOWS®, WINDOWS NT®, UNIX®, or LINUX®. The system memory includes read only memory ("ROM") and random access memory ("RAM"). The general purpose computer device can be any host computer systems configured to operate with devices that can interface with access system 12, including telecommunication switches.

The processing agent 24 and mapping agent 26 herein may be embodied as computer readable instructions stored on a computer readable medium such as a CD-ROM, DVD ROM, removable storage device, hard disk, system memory, embedded memory, flash memory or other data storage medium. The computer readable medium stores computer executable components, or software modules. More or fewer software modules may alternatively be used. Each component or module may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

The access process includes collecting or receiving information about the user. The information may include general information e.g., address, date of birth, telephone number. The information may also include the user's Social Security Number or another type of identification element of the user. The identification element of the user provided acts as the link between the secure identification element issued and the personal information requested. The personal information requested may include credit history, account information or loan history.

In an alternate embodiment, the registration process may include collecting biometric data of the user. The data may include an eye or retinal scan, fingerprint, DNA or facial scan. The information, in addition to the personal information above, may be used to authenticate the user of the secure identification element or to verify the user upon subsequent logins to the access system. For instance, upon subsequent logins, the user may have to put in his or her zip code or allow for a retinal scan in order to access his or her account.

The customer may reach access system 12 via an access communications network 36 that is coupled to the access system 12. The access network may include the Internet 18 and World Wide Web for allowing the customer to enroll and register with the system. Alternatively, the access network may also be a public switched telephone network 14 for enabling the customer to create a telephony connection or telephone call to interface with the access system. As a further alternative, the access network may be a wireless network 16. It should be appreciated that access network may include a plurality of differing networks—for example, a local, national, international telecommunications network, cellular, or Personal Communication Services (PCS) network, cable television, satellite telecommunications networks and/or any other suitable network. It should be recognized that any device that provides network connectivity—such as a landline telephone, a wireless telephony device, a personal computer, or a laptop with a modem, a telephony-enabled personal digital assistant, a handheld terminal device, a palm-sized computer, an IP-enabled telephone—may be used to link access network for coupling to access system.

Figure 2A:
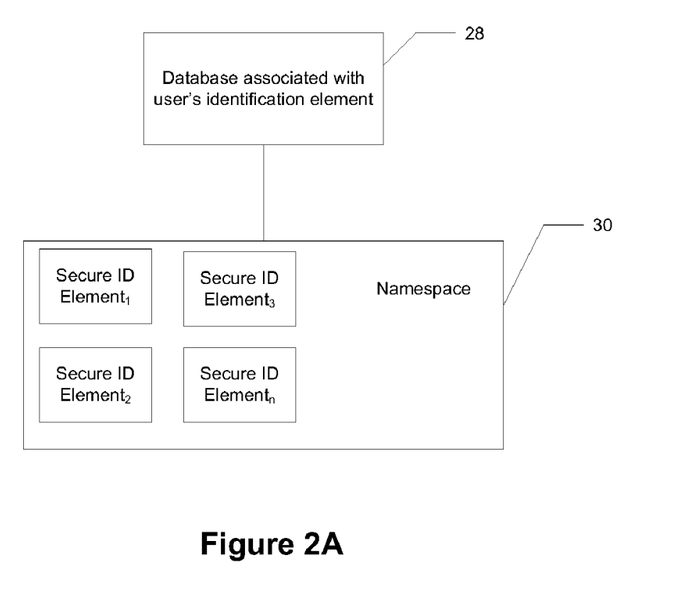
FIG. 2A is a schematic diagram of a database according to one embodiment.

Upon completion of the registration process, a user account is established containing the personal information of the user. This user account may be identified by the identification element of the user. As shown in FIG. 2A, a database 28 is established containing a secure identity namespace 30. The namespace 30 contains secure identification elements generated for a given user.

Figure 2B:
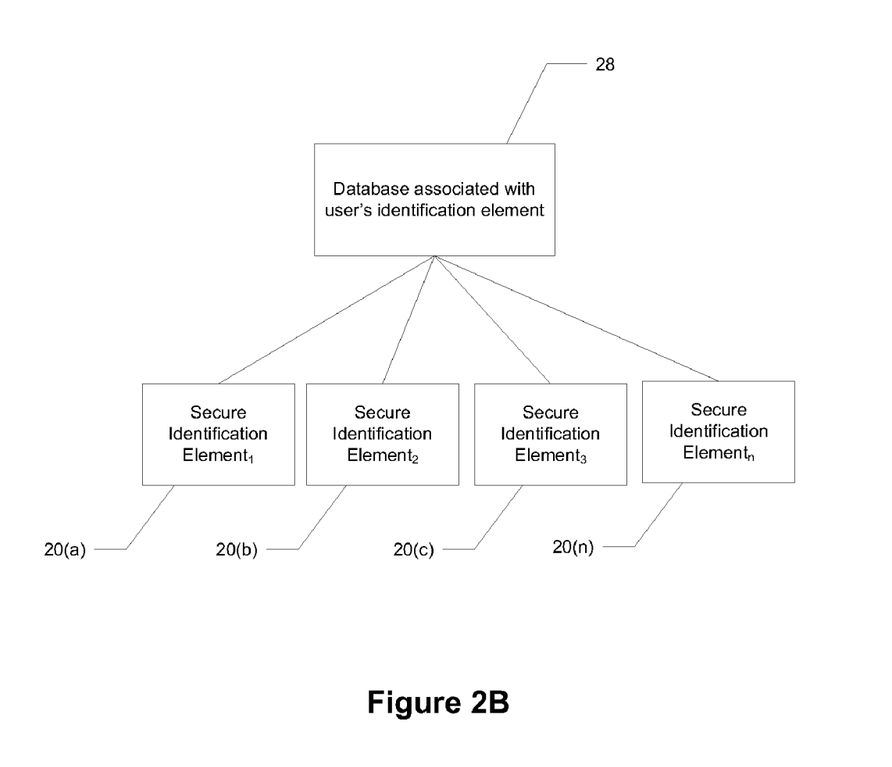
FIG. 2B is a schematic diagram of a database according to one embodiment.

The database 28 may include a secure identification element 20 that may be issued to the user. Additional secure identification elements 20($a$), 20($b$), 20($c$) . . . 20($n$) may be generated by the system and stored in the database 28 until requested by the user, as illustrated in FIG. 2B. FIG. 2B shows database 28 containing a data relationship between the secure identification elements and the identification element of the user, as well as the information associated with the identification element.

It is to be understood that the database 28 comprises a computer-readable storage device that may include one or more magnetic disk drives or, alternatively, optical disk drives such as Compact Disk ROMs, or DVD drives. It should be appreciated that database 28 and associated computer-readable media provide nonvolatile storage of computer-readable code including a plurality of customer records associated to a plurality of customer accounts for an authentication service of the present invention.

Once the secure identification element 20 is generated and transmitted to the user 22, the user may submit the secure identification element 20 to a requesting entity 34 attempting to access the user's personal information. The secure identification element 20 may be submitted to the requesting entity 34 in lieu of the user's identification element, e.g., Social Security Number. The requesting entity 34 may then access the user's personal information by submitting the secure identification element to the trusted entity. In addition, the requesting entity may see a listing of what privileges or information are accessible to them with that particular secure identification element.

In order to access the personal information of the user by way of the secure identification element 20, the secure identification element 20 is provided to the processing agent 24 of the trusted entity 10. The processing agent 24 may be a general purpose computing device of a type similar to that described in the foregoing. As the secure identification element 20 is provided to the processing agent 24, the processing agent 24 authenticates the validity of the secure identification element 20 by confirming the existence of the secure identification element 20 in the secure user's database 28 or other method. In one embodiment, the secure identification element may have an internal checksum to prevent guessing.

Once authenticated, the secure identification element 20 is mapped to the user's personal information by way of the trusted entity's 10 software mapping agent 26. The mapping agent 26 will map the secure identification element 20 to the user's personal information by way of the user's identification element. This mapping function is performed by the trusted entity 10 by way of the software mapping agent 26. The software mapping agent logically links the secure identification element to the personal information of the user via the identification element provided by the user. The mapping function may include associating the secure identification element with the user's identification element or to the information itself. The information may be various classes of information. For example, a person's credit history may be one class of information, while their loan history or current financial information may be another class. The secure identification element may be mapped to all information or to one or more than one class of information.

The mapping function may also include associating the secure identification element with the requesting entity. For example, the secure identification element may be logically linked to the user's Social Security Number and the information associated with it for use by a single requesting entity. In one embodiment, the secure identification element is restricted to use by a particular requesting entity.

In one embodiment, the mapping performed by the mapping agent is kept confidential. It may be known only to entities such as the user or the Internal Revenue Service.

Once the information is accessed via the mapping function, an information segment 32 is transmitted to the requesting entity 34. In one embodiment, once the information segment 32 has been transmitted to the requesting entity 34, the secure identification element 20 used to access that information may no longer be valid. In an alternative embodiment also discussed below, the secure identification element 20 submitted to the requesting entity 34 may be used only by that requesting entity 34 to gain access to the protected information.

Figure 3:
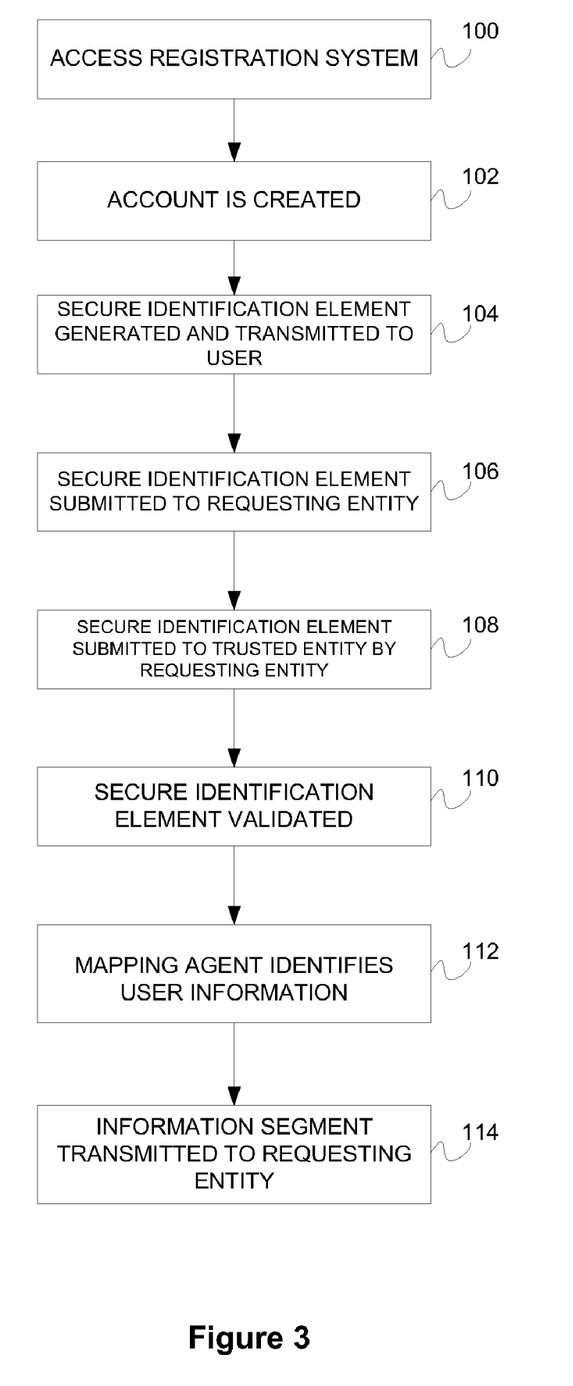
FIG. 3 is a flow diagram illustrating a method of protecting information according to one embodiment.

With reference to FIG. 3, an embodiment of the method of protecting user information is illustrated. At block 100, the system receives a signal initiated by a customer for accessing an access system for the user's account. The signal may correspond to the type of telecommunication access network used by the customer. For example, the signal initiated by the customer may comprise a plurality of digits embodied in DTMF tones. In the case of DTMF tones, accessing the access system may be via a public switched telephone network. Alternatively, the signal may comprise an electronic online method for logging on to the access system, such as a modem of a computer or network interface. As another alternative, the signal may comprise a HyperText Transfer Protocol (HTTP) request from a web page uniform resource locator (URL), such as accessing the access system via the Internet. The web page may be written in a number of ways, such as Hyper Text Markup Language (HTML) or Extensible Markup Language (XML). Other variations of such a HTTP request are contemplated to be within the scope of the invention. Further, the signal may also be any appropriate Internet protocol component for network communications for accessing a web site.

At block 102, the system prompts the user to enter the user's information to create an account and if desired, a personal identification number. At block 104, the account is established and a secure identification element is generated for the user. The secure identification element 20 is logically linked to the personal information of the user by way of the user's identification element. The secure identification elements may be computer readable data or visually readable data. Also at block 104, the secure identification element is then transmitted to the user. The secure identification element may be transmitted as computer readable data via secure email, facsimile or text message, or an encrypted transmission to the user. In addition, the secure identification element may be transmitted via mail or an alternate letter delivery service.

At block 106, the secure identification element is submitted, by the user, to a requesting entity. The requesting entity may be any type of entity seeking access to the user's personal information. At block 108, the secure identification element is submitted to the trusted entity by the requesting entity. At block 110, the processing agent of the trusted entity validates and authenticates the secure identification element submitted. This process may include accessing the database to ensure that the personal information requested is for the user associated with that secure identification element. If the secure identification element is valid for that user, the processing agent directs the software mapping agent to proceed to identify the personal information requested.

At block 112, the software mapping agent of the trusted entity identifies the personal information of the user. This is accomplished by mapping the secure identification element to the personal information via the user's identification element that is associated with such personal information. Once the information is identified, an information segment may be transmitted to the requesting entity, as in block 114.

One advantage of this method of protecting information can be seen with the use of Social Security Numbers. The user may use secure identification elements, such as a virtual Social Security Number, generated by the system in place of a identification element, such as a Social Security Number. The secure identification element may be submitted to any requesting entity, such as a financial institution, to access the user's personal information that would be associated with the user's Social Security Number. The bank may submit the secure identification element to the trusted entity to access the information. The trusted entity may validate the secure identification number and, if valid, map the secure identification number to the user's personal information via the user's Social Security Number. The bank may then access the user's personal information without requiring the user to divulge his or her Social Security Number.

Figure 4:
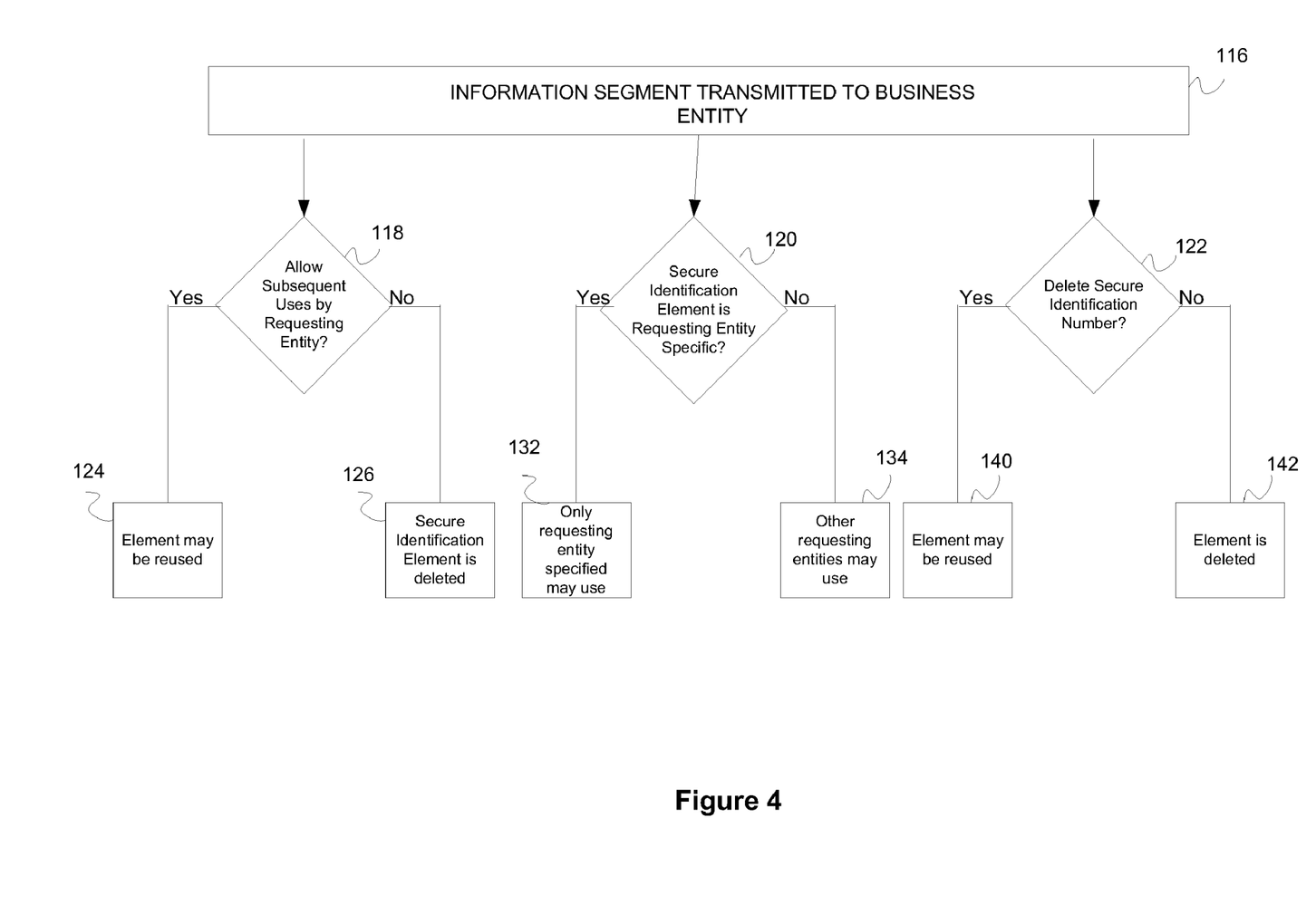
FIG. 4 is a flow diagram of a method of protecting information according to another embodiment.

In reference to FIG. 4, once the personal information has been transmitted to the requesting entity, the secure identification element used to access the information may be invalidated or may continue to be used by the requesting entity, as in block 118. In block 124, the requesting entity is permitted to use the secure identification element again. If the requesting entity is not permitted additional use of the secure identification element, that secure identification element is deleted, as in block 126.

In addition, the user account may be established to allow only one secure requesting entity to access the user's personal information with a certain secure identification element, as in block 120. If the secure identification element is requesting entity specific, then only that requesting entity specified will be permitted to use that secure identification element, as in block 132. If the secure identification element is not requesting entity specific, then additional requesting entities may be permitted to use that secure identification element, as in block 134.

In block 122, the validity of the secure identification element may also be maintained until that secure identification element is deleted. If the secure identification element is deleted, it can no longer be used by the requesting entity, or by the user, as in block 142. If the secure identification element is not deleted, it may be reused by the user, as in block 140. In one embodiment, the trusted entity may guarantee to the requesting entity that the secure identification element will be valid for a given period of time. This may provide security to the requesting entity from fraudulent users. For example, a user may provide a secure identification element to a requesting entity that is a financial institution in order to obtain a loan. If the validity of the secure identification element were not guaranteed for a given period of time, the user may delete the secure identification element and default on the loan. That may leave the financial institution with little recourse against the defaulting user without access to the information linked to the secure identification element.

Figure 5:
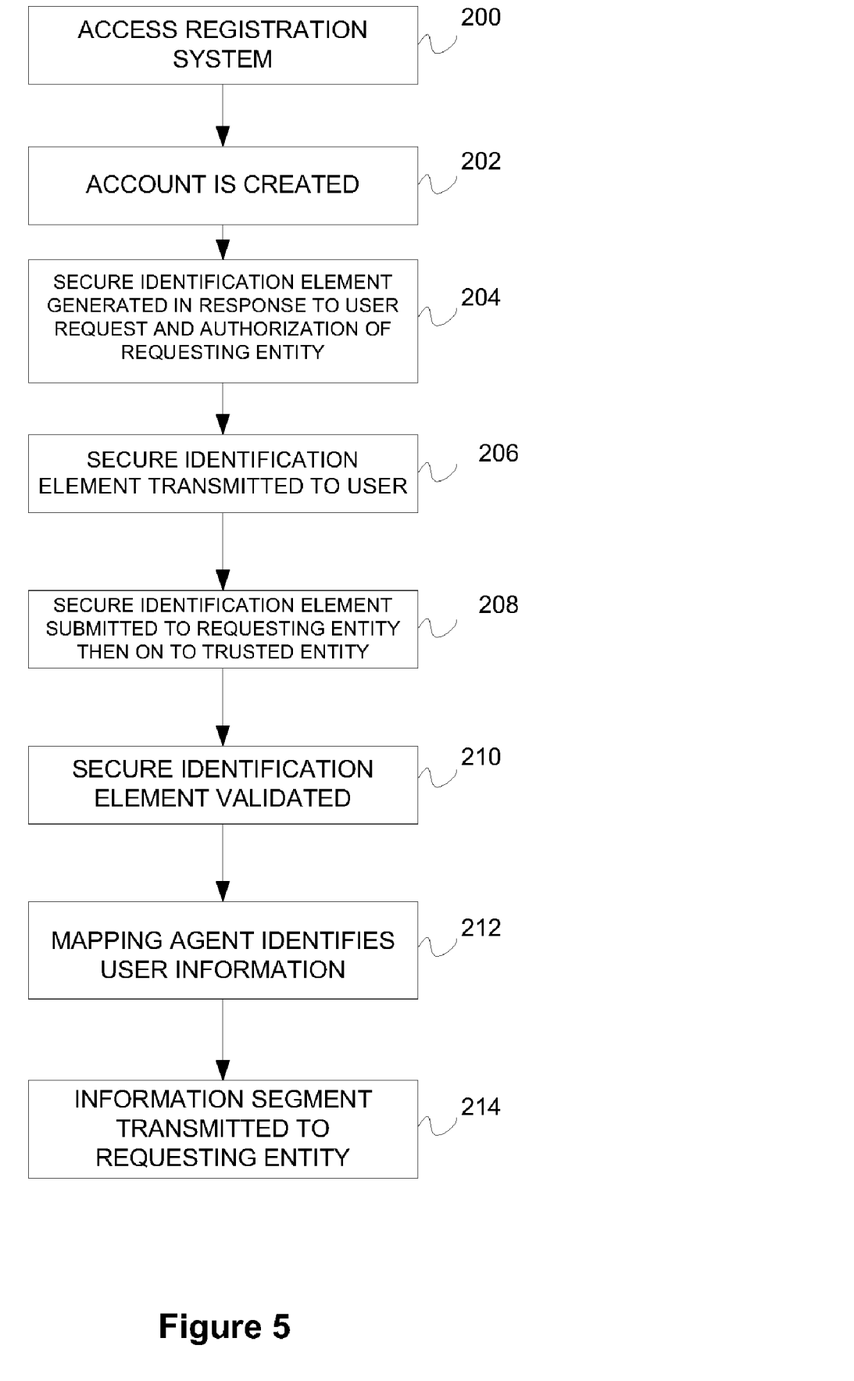
FIG. 5 is a flow diagram of a method of protecting information according to yet another embodiment.

In an alternative embodiment shown in FIG. 5, the secure identification element may be generated by a request for personal information from a requesting entity. For instance, the user may access the access system in block 200 and establish an account in block 202 including specifying the name of a requesting entity authorized to access the user's information. Once an account is established, a specific identification element will be generated to be used by the authorized requesting entity, as in block 204. A requesting entity may then attempt to access certain personal information of the user. In block 206, the secure identification element is transmitted to the user who, in block 208, may then submit it to the authorized requesting entity. In blocks 208-214, the authorized requesting entity may then submit the secure identification element, as described above, to the trusted entity to gain access to the user's personal information.

Figure 6:
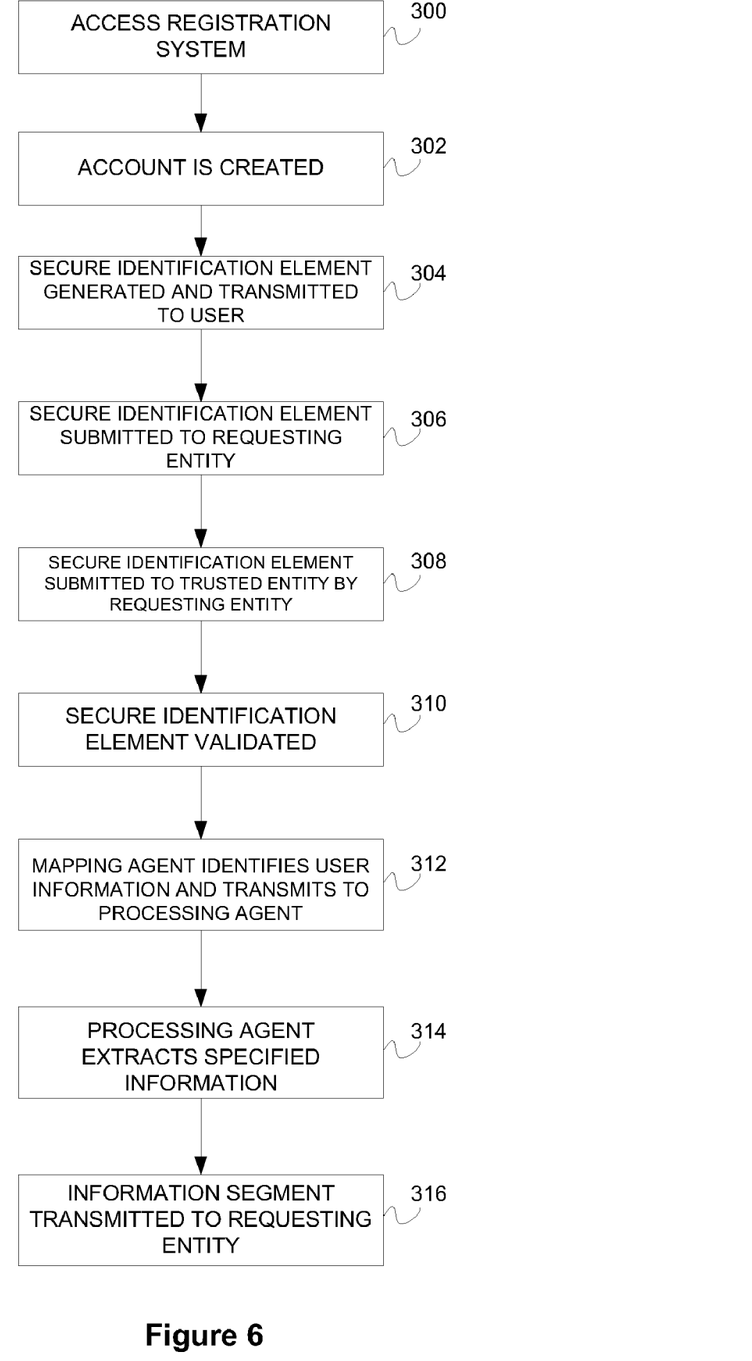
FIG. 6 is a flow diagram of a method of protecting information according to still another embodiment.

In yet another alternative embodiment, as shown in FIG. 6, the processing agent may filter any information out of the personal information being transmitted to the requesting entity. For instance, at block 312, the processing agent receives the requested information via the software mapping agent. In block 314, the processing agent may then extract any information as requested before transmitting the information to the requesting entity in block 316. In one embodiment, the processing agent may extract the user's Social Security Number out of the information being transmitted to the requesting entity.

One advantage of the extracting step shown in FIG. 6 is that the user may continue to maintain the confidentiality of certain information, even after the personal information requested has been transmitted to the requesting entity. Often, information such as a Social Security Number is embedded in a user's personal information. The extracting step provides additional security in maintaining the confidentiality of such information by removing it from personal information being transmitted to the requesting entity.

A fee may be associated with the use of this system. Such fee may be monetary. In addition, the use of the system by the requesting entity may result in a rewards type benefit for the user. For instance, additional allotted minutes, discounts or other rewards may be credited to the user each time a requesting entity accesses that user's information.

In one embodiment, the trusted entity may keep a history of active and deleted secure identification elements. This may be done for audit purposes. The history may be displayed on a graphical user interface and the user may be allowed to view this history.

The foregoing detailed description has set forth various embodiments of the devices and/or processes via the use of block diagrams, flowcharts, and examples. Insofar as such block diagrams, flowcharts, and examples contain one or more functions and/or operations, it will be understood by those within the art that each function and/or operation within such block diagrams, flowcharts, or examples can be implemented, individually and/or collectively, by a wide range of hardware, software, firmware, or any combination thereof. Those skilled in the art will recognize that the embodiments disclosed herein, in whole or in part, can be implemented in standard Integrated Circuits, as a computer program running on a computer, as a program running on a processor, as firmware, or as virtually any combination thereof and that designing the circuitry and/or writing the code for the software or firmware would be well within the skill of one of ordinary skill in the art in light of this disclosure.

A network based computer implemented method of providing access to information is generally implemented with a user access system and a telecommunications network, managed by a trusted entity or a trusted third party. In one example, an access system may include a database, a processing agent and a software mapping manager. Such components have been described above and in reference to the above described figures.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A method of retrieving information in a telecommunications network at a trusted entity, the method comprising:
   receiving a data request for an information segment including personal information associated with a user, the data request being made by way of a secure identification element that is uniquely associated with the user and allows access to the personal information of the user stored at the trusted entity, wherein the secure identification element does not include a Social Security Number of the user;
   authenticating the data request; and
   processing the data request for the information segment via a mapping agent configured to map the secure identification element to the information segment including the personal information of the user.

2. The method of claim 1, the mapping agent logically linking the secure identification element to information requested by way of an identification element of the user.

3. The method of claim 1 further comprising the steps of transmitting the information segment from the trusted entity to a requesting entity.

4. The method of claim 1, the secure identification element being logically linked to the information requested by way of the Social Security Number of the user.

5. The method of claim 1, further comprising the step of performing a mapping function via the mapping agent.

6. The method of claim 1, the information segment being defined by data extracted from user information.

7. The method of claim 6, the step of extracting data being performed by a processing agent associated with the trusted entity.

8. The method of claim 6, the extracting step including the substeps of removing a Social Security Number from the information being retrieved and transmitting the information segment without the removed Social Security Number.

9. The method of claim 1, wherein the secure identification element is provided in lieu of directly providing personal information associated with the user so as to provide enhanced security of personal information in the telecommunications network.

10. A method of retrieving information in a telecommunications network at a trusted entity, the method comprising:

receiving a data request for an information segment including personal information associated with a user, the data request being made by way of a secure identification element that is uniquely associated with the user and allows access to the personal information of the user stored at the trusted entity, wherein the secure identification element does not include a Social Security Number of the user;

authenticating the data request;

processing the data request for the information segment via a mapping agent, the mapping agent logically linking the secure identification element to information requested by way of the Social Security Number of the user;

extracting data from the information segment via the processing agent; and     transmitting the information segment from the trusted entity to a requesting entity.

11. The method of claim 10, wherein the secure identification element is provided in lieu of directly providing personal information associated with the user so as to provide enhanced security of personal information in the telecommunications network.

* * * * *